United States Patent Office 3,586,480
Patented June 22, 1971

3,586,480
PROCESS FOR TREATING ORES AND MINERAL MIXTURES
Ernest Raymond Ground, Melchor Muzquiz, Coahuila, Mexico, assignor to Continental Ore Corporation, New York, N.Y.
No Drawing. Filed May 27, 1968, Ser. No. 732,085
Int. Cl. C01f *11/46;* C01b *25/12*
U.S. Cl. 23—122                                                    3 Claims

ABSTRACT OF THE DISCLOSURE

A process is provided for concentrating phosphorus oxide or barium sulfate-bearing ores by the selective removal of calcium carbonates and oxides. The ore is roasted for a period not exceeding about 120 minutes followed by leaching with an aqueous solution of ammonium chloride. Phosphorus oxide or barium sulfate losses from the insoluble residue to the filtrate are insignificant and the insoluble residue remains in a chemical and physical state very favorable to further processing. Control of time and temperature is necessary to prevent the formation of insoluble calcium compounds.

BACKGROUND OF THE INVENTION

This invention relates to a process for concentrating ores by selectively removing calcium compounds, and in particular, to a beneficiation process for selectively removing calcium carbonates and oxides from ores or mineral mixtures containing, as primary constituents, phosphorus oxides or barium sulfates.

Commercially useful phosphate ores naturally occur associated with clay and silica as the principal impurities. The clay and silica associated with these phosphate ores can generally be removed by typical mineral dressing processes such as washing, gravity concentration, flotation and the like.

There are large worldwide deposits of barite ores and phosphate ores and mineral mixtures such, for example, as barite, staffelite, kurskite, podolite, wilkite and the like which are associated in their natural state with varying amounts of calcium carbonate and calcium oxide. These calcium compounds cannot be removed from the barite or phosphate ores by typical beneficiation treatments. As a result, although these ores in their natural state contain appreciable amounts of barium sulfate or phosphorus oxides as primary constituents (e.g. in amounts of about 80% barite or more or about 15% $P_2O_5$ or more), they are not generally considered to be of commercial importance because of the difficulty and expense of removing the calcium compounds, such as calcium carbonate, which are responsible for the consumption of large amounts of acid during further processing. Hereafter, the term "ore" is means to include a mineral mixture of phosphorus oxide or barium sulfate containing calcium carbonate, calcium oxide and the like.

Although many attempts were made to overcome the foregoing and other difficulties non, as far as I am aware, was entirely successful when carried into practice commercially.

BRIEF SUMMARY

I have now discovered a beneficiation process in which calcium carbonates and oxides can be economically removed from barium and phosphorus-bearing ores resulting in a concentrated ore which is commercially useful.

It is an object of this invention to concentrate ores by providing a process for selectively removing calcium compounds from ores.

Another object of this invention is to provide a process for selectively removing calcium carbonates and oxides from phosphorus and barium-bearing ores.

Still another object of this invention is to provide an economical process for increasing the phosphorus oxide or barium sulfate contents of ores by the removal of calcium carbonates and oxides.

DESCRIPTION OF THE INVENTION

Generally speaking, and in accordance with the present invention, there is provided a process of concentrating ores by selectively removing carbonates and oxides of calcium from ores containing at least one material selected from the group consisting of phosphorus oxides and barium sulfates, including the steps of roasting the ore at a temperature of at least about 825° C. for not more than about 120 minutes to convert substantially all of the calcium carbonate present in the ore to calcium oxides, and then leaching the roasted product with a lixiviating agent comprising an aqueous solution of ammonium chloride, to produce a concentrated, insoluble residue with substantially all the calcium compounds soluble in the aqueous solution of ammonium chloride removed.

In carrying the invention into practice commercially, the roasting temperature should be at least about 825° C., e.g. about 900° C., to keep the calcining reaction proceeding during the roasting operation. In addition, the period of rosting should be at least about 5 minutes but should not exceed about 120 minutes, and is preferably between about 10 minutes and 30 minutes to prevent the formation of insoluble compounds such, for example, as $CaSiO_3$ which remain in the insoluble residue and are not dissolved or carried away with the aqueous ammonium chloride filtrate or leach liquor.

The concentration of the lixiviating agent in the aqueous ammonium chloride is not critical and can be varied from about 1% to 30% by weight ammonium chloride. During the leaching step, it is only necessary for enough ammonium chloride to be present to slightly exceed the stoichiometric amounts necessary to combine with the calcium oxide of the roasted ore.

For the purpose of giving those skilled in the art a better understanding of the invention, a series of examples are presented below wherein ores containing commercially significant amounts of phosphorus oxides or barium sulfates are concentrated by selective removal of calcium carbonates and oxides which are otherwise not removable by conventional mineral dressing processes.

A phosphate ore containing about 22.03% $P_2O_5$, 12.0% $SiO_2$, 38.00% $CaCO_3$, and the balance essentially calcium chemically combined with the phosphorus, was crushed and then ground to a particle size of −100 mesh. Samples of this ore were then roasted in air at about 900° C. (plus or minus 20° C.) for varying lengths of time followed by leaching with a 15% aqueous solution of ammonium chloride for one hour. Table I below shows a series of examples in which the roasting time was varied from 5 minutes to 120 minutes.

TABLE I

|  | Roasting time (minutes) | Weight percent | |
|---|---|---|---|
|  |  | $CaCO_3$ remaining in roasted ore | $P_2O_5$ in insoluble residue |
| Example: |  |  |  |
| 1 | 5 | 10.85 | 27.67 |
| 2 | 10 | 1.78 | 30.50 |
| 3 | 15 | 1.55 | 29.98 |
| 4 | 30 | 1.55 | 29.80 |
| 5 | 60 | 1.33 | 27.26 |
| 6 | 120 | 1.11 | 27.06 |

As can be seen from Table I, the calcium carbonate ($CaCO_3$) remaining in the roasted ore is substantially all removed from the ore by roasting within about 10 minutes.

Further roasting times did not substantially affect the amount of unreacted calcium carbonate in the ore. As can also be seen from the data presented in Table I above, the concentration of phosphorus pentoxide ($P_2O_5$) in the leached ore is essentially at its peak after about 10 minutes of roasting time. Example 2 shows that after roasting for 10 minutes at about 900° C., 30.50% $P_2O_5$ was present in the leached ore. When the roasting time is increased, the concentration of $P_2O_5$ in the insoluble concentrated residue decreases because of the formation of insoluble calcium compounds, e.g. $CaSiO_3$, which, because of their presence, decrease the relative perecntage of $P_2O_5$. Advantageously, the roasting time should be between about 10 minutes and 30 minutes when the roasting temperature is at about 900° C.

As can be seen from Table II below, when the same ore as shown in the examples in Table I above was roasted in air for 10 minutes and leached with a 1% aqueous ammonium chloride solution, in one case for 10 minutes (Example 7) and in another case for 60 minutes (Example 8), the amount of $P_2O_5$ in the leached ore increased only a small amount from 29.40% to 30.04%. Advantageously, leaching periods should not substantially exceed about 10 minutes.

TABLE II

| | Minutes | | $P_2O_5$ in insoluble residue (weight percent) |
|---|---|---|---|
| | Roasting time | Leaching time | |
| Example: | | | |
| 7 | 10 | 10 | 29.40 |
| 8 | 10 | 60 | 30.04 |

Ammonium chloride solutions as low as 1% are sufficient to extract essentially all of the soluble calcium compounds, i.e. calcium oxide and calcium hydroxide, contained in the roasted ore. The leaching or contact time for dissolution can be as short as 10 minutes with extraction of essentially all the ammonium chloride soluble calcium compounds contained in the insoluble residue.

EXAMPLE 9

A phosphate ore containing 20.65% $P_2O_5$, 11.16% $SiO_2$, 31.00% $CaCO_3$, and the balance essentially inert impurities, was roasted in air for about 20 minutes at 900° C. and then leached with a 2% solution of ammonium chloride. An analysis of the roasted ore revealed that only about 0.80% $CaCO_3$ remained. After leaching for 10 minutes, the $P_2O_5$ concentration in the insoluble residue was 29.85%.

EXAMPLE 10

A barite ore containing 83.6% $BaSO_4$, 0.44% $SiO_2$, 15.10% $CaCO_3$, and the balance inert impurities, was crushed to a particle size of −10 mesh and then roasted in air for about 30 minutes at about 900° C. An analysis of the roasted ore showed that only about 0.70% $CaCO_3$ remained. The roasted ore was then leached with a 1% solution of ammonium chloride. After about 10 minutes of leaching, the $BaSO_4$ content of the insoluble residue was 98.4%.

A decided advantage of my invention resides in the fact that $P_2O_5$ losses to the filtrates or leach liquors are insignificant. Analysis of the filtrates revealed that only trace amounts of $P_2O_5$ could be detected. Another advantage of this invention is that the insoluble residue containing the phosphate is left in a finely divided state which is very favorable for further processing such, for example, as reaction with acids to form phosphoric acid or super phosphates.

If ammonium chloride is used as the lixiviating agent, in accordance with this invention, it can be regenerated and recycled if the calcium is precipitated from the filtrate or leach liquor with carbon dioxide which is easily available from the calcining reation during roasting. Another method for regenerating ammonium chloride is to strip the ammonia from the calcium chloride by steam.

Although the present invention has been described in conjunction with preferred ebodiments, it is to be understood that modifications and variations may be resorted to without departing from the spirit and scope of the invention as those skilled in the art will readily understand. Such modifications and variations are considered to be within the purview and scope of the invention and appended claims.

What is claimed is:

1. A process of concentrating an ore by selectively removing calcium carbonates and calcium oxides from ore containing at least one material selected from the group consisting of phosphorus oxides and barium sulfates, including the steps of grinding the ore to a particle size of at least about 100 mesh; roasting the ore at a temperature of from about 825° C. to about 900° C. for about 5 minutes to about 120 minutes to convert substantially all of the calcium carbonates present in the ore to calcium oxides and to prevent the formation of $CaSiO_3$ and then leaching the roasted ore for about 10 to 30 minutes with an aqueous solution of ammonium chloride to provide a concentrated ore consisting of phosphorus oxides or barium sulfate insoluble residue with substantially all the calcium compounds soluble in the aqueous solution of ammonium chloride removed.

2. A process in accordance with claim 1 wherein the ore contains a phosphorus oxide as a primary constituent.

3. A process in accordance with claim 1 wherein the ore contains barium sulfate as a primary constituent.

References Cited

UNITED STATES PATENTS

| 1,758,009 | 5/1930 | O'Brien | 23—122 |
| 1,816,996 | 8/1931 | Barrett | 23—186 |
| 2,127,626 | 8/1938 | Block | 23—186 |
| 2,754,191 | 7/1956 | Hollingsworth et al. | 23—108X |
| 3,240,559 | 3/1966 | Barr | 23—108 |

OSCAR R. VERTIZ, Primary Examiner

C. B. RODMAN, Assistant Examiner

U.S. Cl. XR.

23—108, 186